United States Patent [19]
Bhuta et al.

[11] 3,763,693
[45] Oct. 9, 1973

[54] PULSED ACOUSTO-OPTICAL ECHO IMAGING METHOD AND APPARATUS

[75] Inventors: Pravin G. Bhuta, Torrance; Robert Aprahamian, Marine Del Rey, both of Calif.

[73] Assignee: TRW Inc., Redondo Beach, Calif.

[22] Filed: May 30, 1972

[21] Appl. No.: 258,057

[52] U.S. Cl.......... 73/67.9, 340/5 MP, 178/DIG. 18
[51] Int. Cl. .......................................... G01n 29/04
[58] Field of Search........................ 73/67.5 H, 67.6, 73/67.8 R, 67.9; 340/3 R, 5 MP, 5 H; 178/DIG. 18

[56] References Cited
UNITED STATES PATENTS

| | | | |
|---|---|---|---|
| 3,400,363 | 9/1968 | Silverman | 340/3 |
| 3,488,438 | 1/1970 | Korpel | 340/5 MP X |
| 3,559,465 | 2/1971 | Preston, Jr. | 73/67.5 H |
| 3,600,935 | 8/1971 | Baum | 73/67.5 H |

Primary Examiner—Richard C. Queisser
Assistant Examiner—John P. Beauchamp
Attorney—Daniel T. Anderson et al.

[57] ABSTRACT

An object is acousto-optically imaged by reflecting acoustic pulses from the object imaged into an acoustic wave transmission medium to produce in the medium reflected acoustic wave pulses each containing information representing an image of the object, and projecting monochromatic light-beam pulses through the acoustic medium across the path of the reflected acoustic pulse waves following generation of the acoustic pulses by the acoustic pulse source in such a way that the light-beam pulses undergo Bragg diffraction by reflected acoustic pulse waves from the object to produce optical images of the object corresponding to the image information contained in the acoustic wave pulses. The described application of the invention involves inspection of a work part for subsurface internal flaws and measuring the subsurfaces depth of any flaws by varying the time delay between each acoustic pulse and the following light-beam pulse until a flaw is imaged and measuring the time delay of the beam pulses which image the flaw.

14 Claims, 2 Drawing Figures

PULSED ACOUSTO-OPTICAL ECHO IMAGING METHOD AND APPARATUS

RELATED APPLICATIONS

Reference is made herein to copending application, Ser. No. 829,000, entitled "Acousto-Optical Echo Imaging Method and Apparatus," and filed May 29, 1969, now U.S. Pat. No. 3,685,008, which is hereby incorporated herein by reference.

BACKGROUND OF THE INVENTION

1. Field of the Invention

This invention relates generally to the field of acousto-optical imaging and more particularly to a novel pulsed sound, pulsed light acousto-optical echo imaging method and apparatus.

2. Prior Art

The Korpel U.S. Pat. No. 3,488,438 discloses the basic acousto-optical technique of imaging an object. Simply stated, this acousto-optical imaging technique involves transmitting acoustic waves through an object into an acoustic wave transmission medium to produce within the medium distorted acoustic waves containing information representing an image of the object and projecting a beam of monochromatic light such as from a laser through the medium across the path of the distorted acoustic waves. The light-beam is projected through the acoustic medium in such a way that wavefronts of the light-beam impinge wavefronts of the distorted acoustic waves at an oblique angle, i.e. the Bragg angle, to project by Bragg diffraction an optical image corresponding to the image information contained in the acoustic waves.

In the particular acousto-optical imaging arrangement described in the Korpel patent, the acoustic waves are transmitted through the object to be imaged. That is to say, the acoustic waves from the acoustic source enter one side of the object, pass completely through the object, and emerge from the opposite side of the object as the distorted acoustic waves which are reacted with the light-beam to produce the optical image of the object.

The aforementioned copending application, Ser. No. 829,000, discloses an alternative approach to acousto-optical imaging. This alternative approach involves reflection of the acoustic waves from the object to be imaged and interaction of the monochromatic light-beam with the reflected acoustic waves to produce an optical image of the object. In the copending application, this method of imaging utilizing reflected acoustic waves is referred to as "echo imaging."

SUMMARY OF THE INVENTION

The present invention relates to a modified acousto-optical echo imaging method and apparatus. According to the invention, periodic acoustic pulses rather than continuous or interrupted acoustic wave energy is transmitted to the object to be imaged. These acoustic pulses reflect from the object to an acoustic wave transmission medium to produce in the medium reflected acoustic wave pulses each containing information representing an image of the object. Also, a pulsed monochromatic light-beam rather than a continuous beam is projected through the acoustic medium for interaction with the reflected acoustic wave pulses. Each light-beam pulse is timed to occur after a time delay following each acoustic pulse from the acoustic source, such that the beam pulses intercept and interact with the reflected acoustic wave pulses to produce by Bragg diffraction optical images corresponding to the image information contained in the reflected acoustic pulses.

One unique feature of the invention resides in the fact that the time delay between the occurrence of each acoustic pulse from the acoustic source and the following light-beam pulse may be varied to effect interception of the reflected acoustic wave pulses by and interaction of these pulses with the light-beam pulses and thereby conversion of the image information in the acoustic wave pulses to corresponding optical images. In this regard, it will be understood that the time delay of each light-beam pulse required for interception of the beam pulse by a reflected wave pulse is dependent upon and varies directly with the overall distance from the acoustic source to the object and back to the path of the light-beam pulses.

According to another unique feature of the invention, the time delay between the occurrence of each acoustic pulse from the acoustic source and the following light-beam pulse may be measured. This time delay measurement for a light-beam pulse which intercepts a reflected acoustic wave pulse from the object is related to the distance between the object and the acoustic source and light-beam path.

The disclosed application of the invention involves inspecting a work part for internal flaws. In this application, each acoustic pulse incident on the part is partially reflected by and partially transmitted through the surface and each subsurface discontinunity or flaw encountered by the pulse. Accordingly, each incident acoustic pulse which encounters one or more successive flaws in the work part produces in the acoustic wave transmission medium a leading reflected acoustic wave pulse which reflects from the surface of the part and one or more following reflected acoustic wave pulses which reflect from the successive flaws. The time delay of the light-beam pulses is varied to selectively image the flaws and is measured to determine the subsurface depth of each flaw.

DESCRIPTION OF THE PREFERRED EMBODIMENTS

Figure 1:
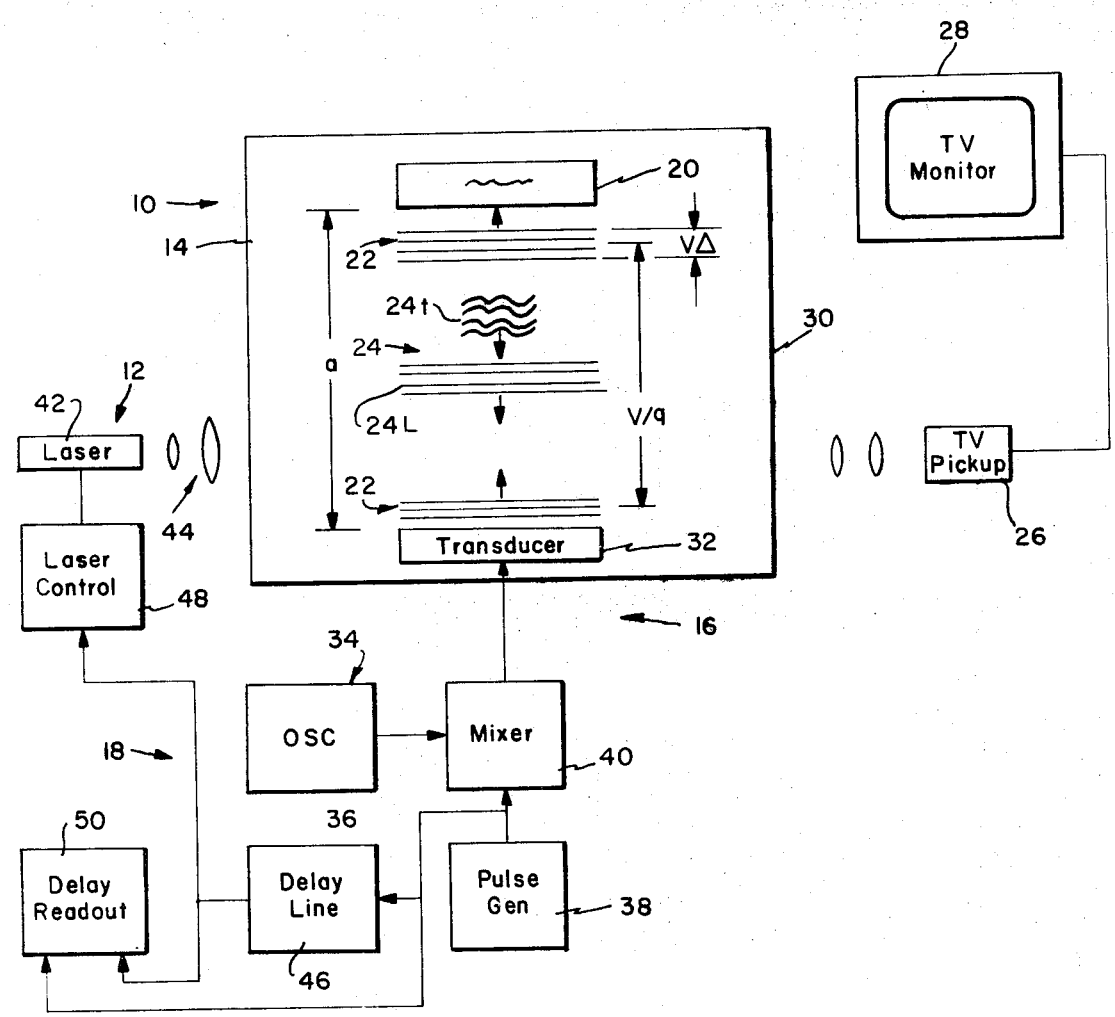
FIG. 1 illustrates acousto-optical imaging apparatus according to the invention in its acoustic pulse generation phase.
Figure 2:
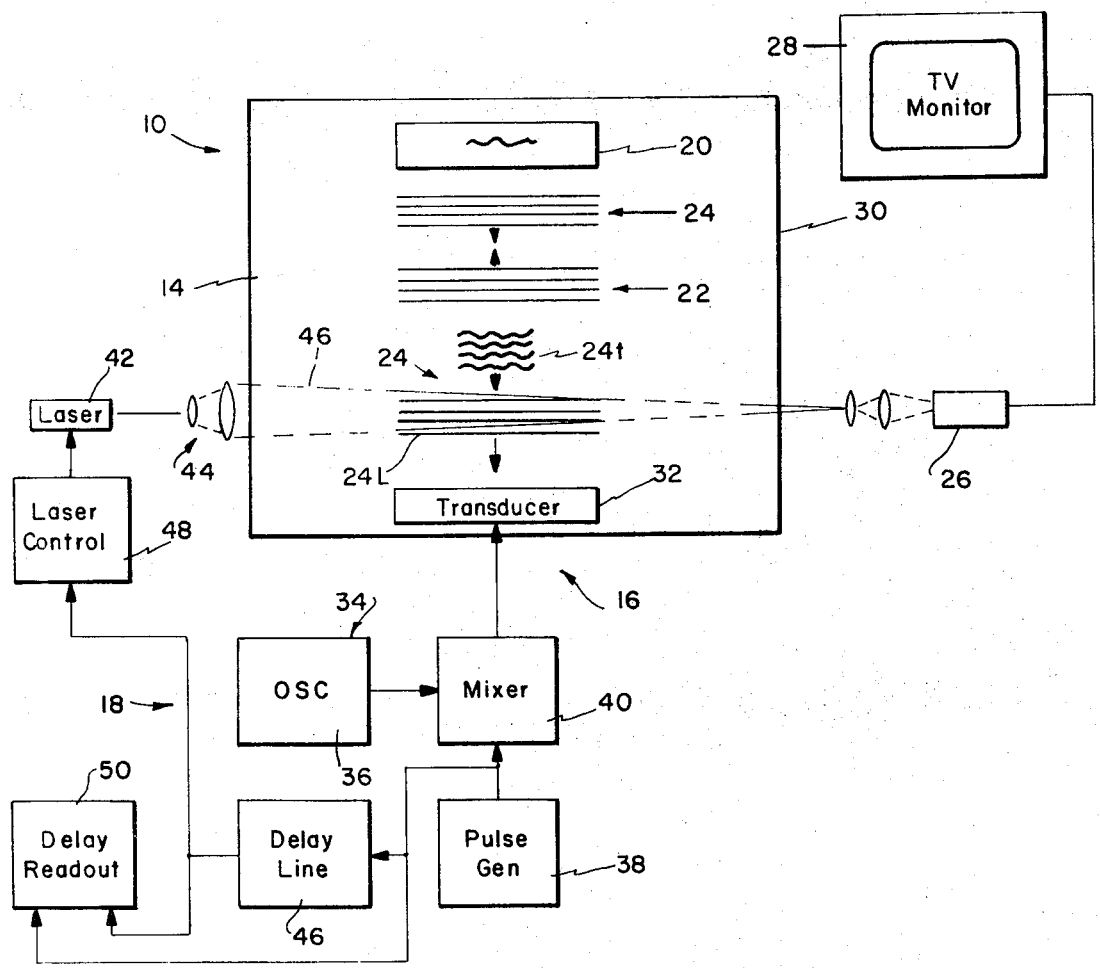
FIG. 2 illustrates the apparatus in its reflected acoustic pulse imaging phase.

Referring to the drawings, the illustrated acousto-optical imaging apparatus 10 of the invention includes a monochromatic light-beam source 12, an acoustic wave transmission medium 14 transparent to light from the source 12, an acoustic source 16, and timing means 18 for operating the beam source 12 and acoustic source 16 in a variable phased pulse mode. Briefly, in operation of the imaging apparatus, the acoustic wave transmission medium 14 is acoustically coupled to an object 20 to be imaged. The acoustic source 16 is operated in a pulsed mode to transmit acoustic pulses 22 to the object 20 in such a way that the pulses reflect from the object to the acoustic medium 14 to produce in the medium reflected acoustic wave pulses 24 containing information representing images of the object. The light-beam source 16 is operated in a pulsed mode to project light-beam pulses through the acoustic medium across the path of the reflected acoustic wave pulses 24. Such pulsed operation of the light-beam and acoustic sources is synchronized by the operating means 18 in a manner such that each light-beam pulse occurs after a time delay following initiation of an acoustic pulse by the acoustic source. This time delay is variable to effect interception of reflected acoustic wave pulses 24 by the light-beam pulses.

As will be described in more detail presently, the light-beam pulses are projected across the path of the reflected acoustic wave pulses in such a way that the wavefronts of the light-beam pulses impinge at an acute angle, i.e. the Bragg angle, wavefronts of the reflected acoustic wave pulses to produce by Bragg diffraction an optical image corresponding to the image information contained in the reflected acoustic wave pulses. In the particular apparatus shown, this optical image is received by a television pickup 26 for viewing in a television monitor 28. Alternatively, the image may be optically projected onto a viewing screen.

As noted earlier, the principal application of the invention involves non-destructive inspection of a work part for internal or subsurface flaws. The particular imaging apparatus illustrated is designed for this inspection application. Referring in detail to this apparatus, the wave transmission medium 14 is a liquid, such as water, contained within a tank 30 with walls transparent to the light from light-beam source 12. The tank and acoustic transmission medium together constitute an acoustic wave coupler or Bragg cell. The object or work part 20 to be examined is immersed within the acoustic medium 14. However, it is possible to locate the part outside the wave coupler in accordance with the teachings contained in the earlier mentioned copending application.

Acoustic source 16 comprises an acoustic transducer 32 and a driver 34 for the transducer. Transducer 32 is mounted within the wave coupler tank 30 opposite the part 20. The transducer driver 34 comprises a fixed frequency oscillator 36 and a pulse generator 38 feeding a mixer 40. Each output pulse of the pulse generator 38 conditions the mixer 40 to feed the oscillator output to the transducer 32 to drive the latter and produce an acoustic pulse 22 within the acoustic medium 14. Pulses 22 travel through the medium to the part 20 to be examined and are then reflected from the part back through the medium toward the transducer, as explained in more detail presently.

The light-beam source 12 comprises a pulsed monochromatic light source 42, such as a pulsed laser, located outside the wave coupler tank 30. A diverging-converging lens system 44 is arranged between the light source and tank for projecting a converging light-beam 46 from the light source, when activated, through the transparent walls of the wave coupler tank and the acoustic medium along a beam path transverse to the path of the acoustic pulses 22, 24 and passing between the part 20 and acoustic transducer 32.

As noted earlier, the light-beam source 12 and acoustic source 16 are operable in a variable phased pulse mode by the timing means 18. Timing means 18 comprises a variable delay line 46 which receives each output pulse from the pulse generator 38, and after a time delay determined by the delay line setting, delivers a pulse to the laser control 48 for flashing the laser to produce a light-beam pulse. The delay line has means for selectively adjusting the time delay introduced by the delay line. The output pulses from the pulse generator 38 and delay line 46 are delivered to a readout unit 50 for indicating the duration of the time delay.

The operation of the illustrated pulsed acousto-optical echo imaging apparatus will now be explained. The acoustic transducer is designed and driven periodically to generate acoustic pulses 22 of temporal width $\Delta$ at a repetition rate of q per second. These pulses travel through the acoustic medium 14 at a velocity of V feet per second. Accordingly, the spatial pulse width is $V\Delta$ and the spatial pulse separation is $V/q$.

As each acoustic pulse 22 impinges the part 20, a portion of the incident pulse energy is reflected from the front boundary surface of the part back toward the transducer 32 and the remaining portion of the pulse energy is transmitted through the surface into the part. Assuming that the part contains no internal or subsurface flaws or other discontinuity, the portion of the incident pulse energy which enters the part will propagate completely through the part until it encounters the rear boundary of the part. At this point, a portion of the transmitted pulse energy is reflected back through the part and the acoustic medium 14 toward the transducer and the remaining portion of the transmitted pulse energy is transmitted through the boundary into the acoustic medium. Under these conditions, each acoustic pulse 22 incident on the part produces two reflected acoustic pulse waves 24, i.e. a leading reflected wave pulse containing information representing an image of the front surface and a trailing reflected wave pulse containing information representing an image of the rear boundary of the part.

Assume now that the part 20 under examination contains a subsurface flaw 42, such as a crack, hole or the like. In this case, each incident acoustic pulse 22 is partially reflected from the front surface of the part to produce a leading reflected acoustic wave pulse 24L. The portion of the incident pulse energy which enters the part encounters the flaw 42 and is partially reflected by and partially transmitted through the flaw. The reflected portion of the acoustic pulse energy produces in the acoustic medium 14 a trailing reflected acoustic wave pulse 24t containing information representing an image of the flaw. This action is repeated for each successive flaw encountered by the incident acoustic pulse energy which enters the part. Accordingly, each acoustic pulse 22 incident on the part 20 produces in the acoustic medium 14 a leading reflected acoustic wave pulse 24L and one or more trailing acoustic wave pulses 24t containing information representing images of the front boundary or surface, each subsurface flaw, and the rear boundary of the part.

It is important to note here that the temporal width $\Delta$ of the acoustic pulses must be less than the time required for the acoustic energy to travel from the front boundary of the part to the first flaw and return. Otherwise the leading and trailing reflected acoustic wave pulses will overlap.

The light-beam source 12 is activated or pulsed after a time delay following generation of each acoustic pulse 22 by the acoustic source 16, such that each light-beam pulse from the beam source intercepts a reflected acoustic wave pulse 24. The light wavefronts of the beam pulse then impinge at an oblique angle, i.e. the Bragg angle, wavefronts of the reflected acoustic wave pulse to produce by Bragg diffraction an optical image corresponding to the image information contained in the intercepted reflected wave pulse. The mechanics of this optical imaging action by Bragg diffraction is explained in detail in the earlier referenced Korpel patent and copending application and need not be explained here. Suffice it to say that the resulting optical image is displayed on the television monitor 28.

If the time delay t of each light-beam pulse, i.e. the time delay between the occurrence of each acoustic pulse 22 and the following light-beam pulse is set so that $t = (2a)/V$ where $a$ is the distance between the part 20 and the acoustic transducer 32, the resulting image will be that of the front boundary or surface of the part. Successive subsurface flaws, if any, in the part may be selectively imaged by increasing the delay time t until light-beam pulses occur at the precise moments the reflected acoustic wave pulses from the selected flaw are situated in the light-beam path.

The depth d of an imaged flaw may also be obtained by measuring the corresponding light-beam pulse delay time $t$. Thus, $$d = \frac{1}{2} V'[(t - 2a/V)]$$

where $V'$ is the velocity of the acoustic waves in the material of the part 20 being examined.

It will be immediately evident to those versed in the art that the present pulsed acousto-optical echo imaging technique may be combined with that shown in FIG. 1 of the earlier mentioned copending application to provide an acousto-optical echo ranging system for locating and obtaining the range of a submerged object.

What is claimed as new in support of Letters Patent is:

1. The acousto-optical method of imaging an object which comprises the steps of:
    selecting a monochromatic light-beam source, an acoustic medium transparent to the light from said beam source, and an acoustic source of given frequency;
    transmitting acoustic pulses from said acoustic source to said object in such a way that said acoustic pulses reflect from said object into said acoustic medium to produce in said medium reflected acoustic wave pulses each containing information representing an image of said object; and
    projecting a light-beam pulse from said beam source through said acoustic medium across the path of the reflected acoustic wave pulses following each acoustic pulse from said acoustic source in a manner such that a time delay exists between each acoustic pulse and the following light-beam pulse and light wave fronts of each beam pulse impinge at an acute angle wavefronts of the reflected acoustic wave pulse if any in the path of the beam pulse to produce by Bragg diffraction an optical image corresponding to the image information contained in the respective acoustic wave pulse.

2. The imaging method according to claim 1 including the additional step of:
    varying said time delay of each light-beam pulse.

3. The imaging method according to claim 2 including the additional step of:
    measuring said time delay of each light-beam pulse.

4. The imaging method according to claim 1 wherein:
    said object is a work part to be checked for internal flaws;
    the surface of said part reflects each incident acoustic pulse to produce in said acoustic medium a leading reflected acoustic wave pulse containing information defining an image of said part surface; and
    each subsurface flaw in said part reflects each incident acoustic pulse to produce in said acoustic medium a reflected acoustic wave pulse following the respective leading reflected acoustic wave pulse and containing information defining an image of the corresponding flaw, whereby a subsurface flaw may be imaged by providing the proper light-beam pulse time delay.

5. The imaging method according to claim 4 including the additional step of:
    varying said delay time of each light-beam pulse to image flaws at different subsurface depths in said part.

6. The imaging method according to claim 5 including the additional step of:
    measuring said time delay of each light-beam pulse to permit determination of the subsurface depth of each imaged flaw.

7. The imaging method according to claim 6 wherein:
    said acoustic pulses are transmitted through said acoustic medium from said acoustic source across the path of said light-beam pulses, to said part and the acoustic pulses are reflected from said part back through said acoustic medium and across said light-beam path.

8. Acousto-optical apparatus for imaging an object comprising:
    a monochromatic light-beam source;
    an acoustic medium transparent to the light from said beam source and adapted to be disposed in acoustically coupled relation to said object;
    means including an acoustic source of given frequency disposed in acoustically coupled relation to said acoustic medium for transmitting acoustic pulses to said object in such a way that said acoustic pulses reflect from said object into said acoustic medium to produce in said medium reflected acoustic wave pulses each containing information representing an image of said object; and
    means for projecting a light-beam pulse from said beam source through said medium across the path of said reflected acoustic wave pulses following each acoustic pulse from said acoustic source in a manner such that a time delay exists between each acoustic pulse and the following light-beam pulse and light wavefronts of each beam pulse impinge at an acute angle wavefronts of the reflected acoustic wave pulse if any in the path of the beam pulse to produce by Bragg diffraction an optical image corresponding to the image information contained in the respective acoustic wave pulse.

9. Acousto-optical imaging apparatus according to claim 8 including:
    means for varying said time delay of each light-beam pulse.

10. Acousto-optical imaging apparatus according to claim 9 including:
    means for measuring said time delay of each light-beam pulse.

11. Acousto-optical imaging apparatus according to claim 8 wherein:

said object is a work part to be checked for internal flaws;

the surface of said part reflects each incident acoustic pulse to produce in said acoustic medium a leading reflected acoustic wave pulse containing information defining an image of said part surface; and each subsurface flaw in said part reflects each incident acoustic pulse to produce in said acoustic medium a reflected acoustic wave pulse following the respective leading reflected acoustic wave pulse and containing information defining an image of the corresponding flaw, whereby a subsurface flaw may be imaged by providing the proper light-beam pulse time delay.

12. Acousto-optical imaging apparatus according to claim 11 including:

means for varying said time delay of each light-beam pulse to image flaws at different subsurface depths in said part.

13. Acousto-optical imaging apparatus according to claim 12 including:

means for measuring said time delay of each light-beam pulse to permit determination of the subsurface depth of each imaged flaw.

14. Acousto-optical imaging apparatus according to claim 13 wherein:

said acoustic pulses are transmitted through said acoustic medium from said acoustic source across the path of said light-beam pulses, to said part and the acoustic pulses are reflected from said part back through said acoustic medium and across said light-beam path.

* * * * *